July 22, 1952 W. ANGST 2,604,117
HIGH-POWER DIAPHRAGM CAPSULE ASSEMBLY
Filed July 2, 1949 2 SHEETS—SHEET 1
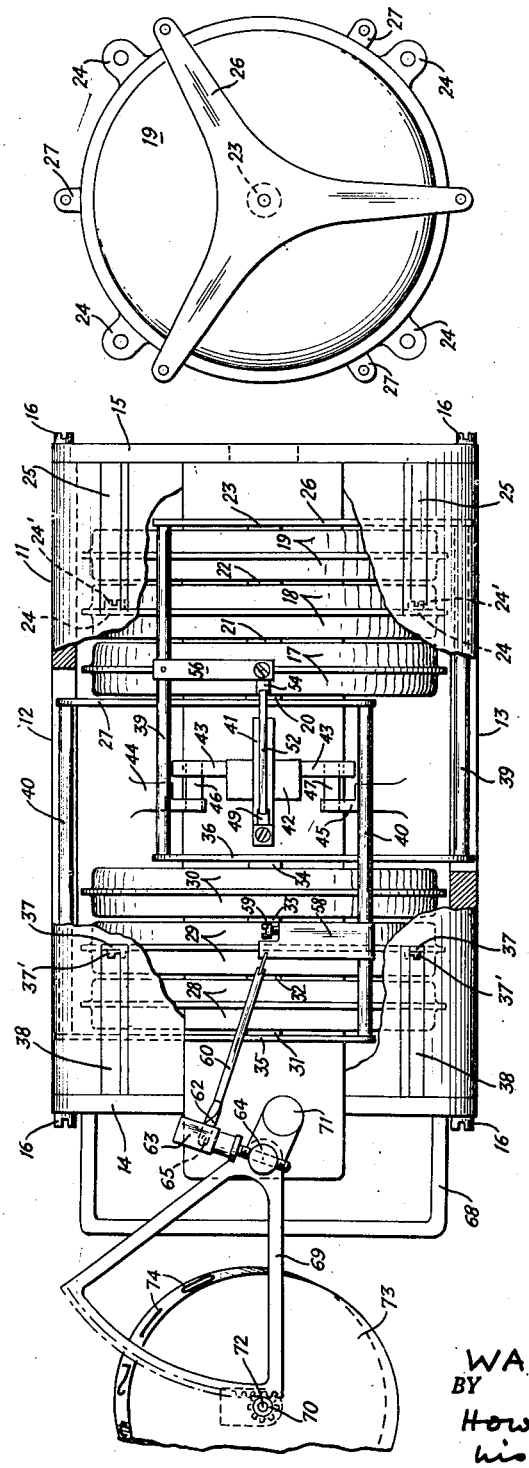
INVENTOR.
WALTER ANGST
BY
Howard G. Russell
his ATTORNEY.

July 22, 1952 W. ANGST 2,604,117
HIGH-POWER DIAPHRAGM CAPSULE ASSEMBLY
Filed July 2, 1949 2 SHEETS—SHEET 2

INVENTOR.
WALTER ANGST
BY
Howard G. Russell
his ATTORNEY

Patented July 22, 1952

2,604,117

UNITED STATES PATENT OFFICE 2,604,117

HIGH-POWER DIAPHRAGM CAPSULE ASSEMBLY

Walter Angst, Manhasset, N. Y., assignor, by mesne assignments, to Kollsman Instrument Corporation, Elmhurst, N. Y., a corporation of New York Application July 2, 1949, Serial No. 102,799

6 Claims. (Cl. 137—785)

This invention relates to improvements in pressure responsive instruments and is particularly directed to instruments of which extreme accuracy of performance is required. The invention provides a pressure responsive assembly capable of exerting considerable power and suited, by reason of this characteristic, for actuating certain mechanisms which call for an operating torque greater than the torque required by a conventional indicator of the movable pointed or movable dial type.

The present invention is admirably suited for improving the performance as well as the readability of aircraft altimeters of great operating range. It has been found that the conventional indicator arrangement consisting of a dial and a plurality of movable pointers is a frequent source of erroneous reading by the pilot because of the difficulty of reading the movable pointers against the dial. This is particularly true of altimeters having a range in excess of ten thousand feet.

In order to eliminate the danger of mis-reading altimeters, it has been proposed to substitute for the conventional multi-pointer indicator a single pointer covering a range of one thousand feet in one revolution, supplemented by an indicator of the movable figure type generally found in counters to indicate thousands and tens of thousands of feet.

Movable figure indicators generally consist of a plurality of coaxial drums geared in a ratio of 1 to 10. Since it is desirable to have full figures appear at all times, it is necessary to move at least one drum and occasionally two drums when the single pointer moves past a thousand foot mark. This requires a certain operating torque, even if an indicating mechanism of highest precision is employed.

The pressure responsive element of a conventional pointer altimeter normally need not exert any appreciable torque, since the bearing friction in a pointer altimeter is small and is practically eliminated by the vibrations present in an aircraft. Therefore, a pointer is usually capable of furnishing a lag-free indication throughout the range of the instrument unless other supplementary mechanism imposes an additional load on the pressure responsive element.

An indicator of the counter type is such a supplementary mechanism which imposes an increased load on the pressure responsive element every time a drum has to be advanced. This means that the pressure responsive element must exert a certain torque in order to move the indicator. Such torque is only built as a result of a change in pressure to which the indicator, at least momentarily, does not respond, until finally the change in pressure has become sufficiently great to result in a torque of sufficient magnitude to overcome the aforesaid load and advance the indicator. This lag in the indication is objectionable, particularly since it occurs at the more or less critical thousand feet levels.

The present invention provides a pressure responsive diaphragm assembly capable of exerting a considerable amount of force in response to relatively small changes in pressure and permits the construction of an altimeter of the counter type in which the lag of the indicator is so small as to be practically negligible. The invention further provides a diaphragm assembly furnishing within practical limits any amount of power required of a pressure responsive instrument of the indicating or actuating type, so that the degree of lag due to temporary loads imposed by the indicator or other actuating mechanism can be made as small as desirable.

This feature makes the invention also applicable to sensitive pressure responsive instruments for actuating electrical contact mechanisms, in fact any type of mechanism which imposes an appreciable load on the diaphragms, regardless of whether the load is evenly or unevenly distributed over the range of the instrument.

Over and beyond the aforementioned functions the invention provides a pressure responsive instrument comprising a plurality of diaphragms in which a resultant movement is produced which is the mean value of the movement of the individual diaphragms, so that errors of individual diaphragms are minimized. The invention thus provides an assembly of individual pressure responsive diaphragms, capsules, or similar devices in which errors of individual diaphragms are not cumulative, but are reduced to any desired fraction of the individual error.

These and other objects, features and advantages of the invention will appear more fully from the detailed description which follows accompanied by drawings showing, for the purpose of illustration, a preferred embodiment of this invention. The invention also consists in certain new and original features of construction and combination of parts hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1 is a side view of a high power diaphragm capsule assembly incorporating the present invention, the view being taken on line 1—1 of Figure 3, certain portions being shown broken away to disclose structural details;

Figure 2 is an end view of the diaphragm capsule assembly proper, the enclosing housing being omitted for the purpose of clarity.

Figure 3:
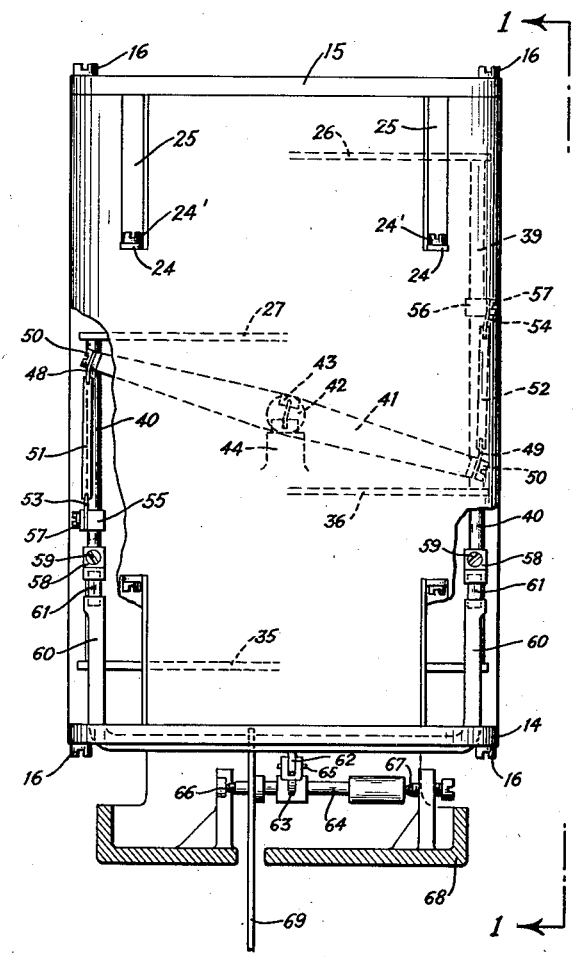
Figure 3 is a plan view of the assembly shown in Figure 1, parts of the assembly being shown in section, and certain portions being shown broken away.

In the following description and in the claims various details will be identified by specific names for convenience. The names, however, are intended to be as generic in their application as the art will permit. Corresponding reference characters refer to corresponding parts in the several figures of the drawings.

In the drawings accompanying, and forming part of this specification, certain specific disclosure of the invention is made for the purpose of explanation of broader aspects of the invention, but it is understood that the details may be modified in various respects without departure from the broad principles of the invention and that the invention may be applied to other structures than the one shown.

The diaphragm capsule assembly shown in Figures 1 and 2 comprises a supporting housing 11 suitable for mounting within a conventional instrument casing (not shown). The various elements constituting the assembly are mounted within the housing 11 which is of substantially cylindrical shape and consists of two substantially identical housing portions 12 and 13 held together by a front end plate 14 and a rear end plate 15 secured to the housing portions by screws 16. A first stack of three evacuated diaphragm capsules 17, 18 and 19 is mounted within the rear portion of the housing 11. The capsules have central bosses 20, 21, 22 and 23 of which the bosses 21 and 22 serve to interconnect the three capsules 17, 18 and 19. The stack of capsules is supported within the housing intermediate its ends. For this purpose the central capsule 18 is provided with peripheral lugs 24. These lugs protrude into corresponding slots 25 of the wall of the housing 11 and are secured to the housing 11 by screws 24'. The slots 25 extend into the housing wall from the rear end plate 15.

As a result of the support of the stack of capsules the terminal boss 20 tends to move to the left upon a certain decrease in ambient pressure and the terminal boss 23 tends to move an equal distance to the right. The terminal boss 23 carries a three-armed spider 26 and the terminal boss 20 carries a similar spider 27 whose arms are offset 60 degrees with respect to the arms of the spider 26. As a result of this arrangement the arms of the spider 26 tend to move in one direction an equal distance as the arms of the spider 27 move in the opposite direction.

A second stack of diaphragm capsules comprising evacuated capsules 28, 29 and 30 is mounted in the forward end of the housing. The capsules carry central bosses 31, 32, 33 and 34 of which the bosses 32 and 33 serve to interconnect the three capsules while the terminal bosses 31 and 34 carry spiders 35 and 36, respectively. The central diaphragm capsule 29 has peripheral lugs 37 secured to the bottom of slots 38 in the housing 11 by screws 37'.

The diaphragm capsules of both stacks are preferably of identical dimensions and pressure characteristics. It is therefore apparent that the spiders 35 and 36 of the last described stack of capsules will tend to move the same distance and in the same direction as the spider 27 and 26, respectively.

Corresponding spiders are connected by connecting rods. Rods 39 secured to the ends of the spider 26 and 36 and connecting rods 40 are secured to the arms of the spiders 27 and 35, respectively.

Suitable means are provided for coordinating the movement of the coupled spiders on the ends of the two stacks of diaphragms. Such mechanisms may suitably comprise a rocking arm 41 having a central shaft portion 42 from which arms 43 extend outwardly. These arms are pivotally mounted on inwardly extending bosses 44 and 45 of the housing 11. In order to provide for a pivotal support free from play or lost motion, the arms 43 as well as the ends of the boss 44 and 45 are slotted at the ends and have secured within the slots a pair of flexible flat springs 46 and 47.

The ends of the rocking arm 41 have similar flat springs 48 and 49 secured thereto by means of screws 50, the ends of the last named flat springs being securely attached to link rods 51 and 52. The remote ends of the link rods 51 and 52 are provided with similar flat springs 53 and 54 clamped to the ends of arms 55 and 56 by screws 57. The arms 55 and 56 are fixedly secured to the rods 40 and 39, respectively.

It will now be apparent that a change in ambient pressure causing expansion or contraction of the diaphragm capsules and a corresponding movement of the connecting rods 39 and 40 will result in a rocking movement of the arm 41 in a clockwise or counterclockwise direction.

In order to transmit the diaphragm motion to an indicator two of the connecting rods 40 carry actuating arms 58. These arms are preferably adjustably clamped to the rods by clamping screws 59 for calibration purposes. The ends of the arms 58 are linked to a yoke 60 by flat springs 61 and the yoke has a central lug 62 to which the arm 63 of a rock shaft 64 is pivotally connected at 65. The rock shaft 64 is pivotally supported at 66 and 67 within a mounting base 68 integral with the front end plate 14. The rock shaft 64 carries a gear sector 69 meshing with an indicator pinion 70 and is counterbalanced by a weight 71. The indicator pinion is secured to an indicator shaft 72 carrying an indicator drum 73 on whose periphery numerals 74 may be engraved. The drum 73 may be coupled to further coaxial drums of equal diameter in any desired ratio of transmission, preferably the ratio of 10 to 1. Since such an arrangement is conventional in counters, it requires no further detailed illustration or description.

The operation of the device is evident from the aforegoing description and is briefly as follows:

If a decrease in ambient pressure occurs, all the diaphragm capsules expand an equal amount assuming that all the capsules have equal pressure characteristics. As a result the connecting rods 39 will move to the right and the connecting rods 40 will move an equal distance to the left. The rods 39 and 40 are coupled by the rocking arm 41. The movement of the rods 40 is transmitted to the yoke 60 which by reason of its connection to the rock shaft 64 causes the gear sector 69 to turn in a counter-clockwise sense. The pinion 70 and the indicator drum 73 turn in a clockwise direction and cause the indicia on the drum to advance in an ascending sense.

The illustrated assembly results in a multiplication of the power of each individual capsule by four and furthermore results in a movement of each of the conecting rods 39 and 40 which is one and a half times the expansion or contraction of a single diaphragm capsule.

The illustrated assembly thus produces a resultant motion which exceeds the motion of an individual capsule by 50 percent and it makes available a power which exceeds the power of an individual diaphragm capsule by 300 percent. The load of the indicating mechanism on the individual capsule is correspondingly reduced and the lag which such a load would cause in the indication is lessened in the same proportion.

It is quite obvious that the stacks of capsules which in the illustrated example are made up of three individual capsules could also be made up of two, four, five or more capsules resulting in a correspondingly reduced or increased movement of the connecting rods 39 and 40.

It is also quite apparent that errors arising from errors in the pressure movement characteristic of a single diaphragm are reduced. In the illustrated form of assembly an error arising from a faulty characteristic of one capsule is reduced by the action of the other five, and the movement of the indicating means becomes the mean value of the movements of all the capsules. Thus the accuracy of the instrument is greatly increased.

While in the illustrated form of apparatus the device actuated by the diaphragm capsules is an indicator, it is apparent that any other form of device requiring actuation in dependence on changes in pressure could be operated by the illustrated assembly.

What is claimed is:

1. A high power diaphragm capsule assembly, particularly for aircraft instruments, comprising, a support; a plurality of diaphragm capsules constituting a first stack mounted on said support intermediate the ends of the stack for movement of the ends of the stack in opposite directions upon a change in pressure; a plurality of diaphragm capsules constituting a second stack mounted on said support intermediate the ends of the second stack, substantially in line with said first stack, for movement of the ends of the second stack in opposite directions upon a change in pressure; a spider carried by each of the free ends of said first and said second stack, the spiders extending beyond the periphery of said capsules; connecting members connecting as a first unit the spiders of the first and second stack tending to move in one direction upon a certain change in pressure; connecting members connecting as a second unit the spiders of the first and second stack tending to move in the opposite direction upon said certain change in pressure; a rocking beam mounted on said support between said two stacks to couple said units together, one arm of the rocking beam being connected to said one unit and the other arm of the rocking beam being connected to said other unit, whereby the movement of the ends of the two stacks is averaged and their power is totaled.

2. A high power diaphragm capsule assembly, particularly for aircraft instruments, comprising, a support; a plurality of diaphragm capsules constituting a first stack mounted on said support intermediate the ends of the stack for movement of the ends of the stack in opposite directions upon a change in pressure; a plurality of diaphragm capsules constituting a second stack mounted on said support intermediate the ends of the second stack, substantially in line with said first stack, for movement of the ends of the second stack in opposite directions upon a change in pressure; a spider carried by each of the free ends of said first and said second stack, the arms of the spiders extending beyond the periphery of said capsules, the spider on one end of one stack being aligned with the spider at the corresponding end of the other stack, and the spider on the other end of the one stack being aligned with the spider at the other end of the other stack; connecting rods connecting the arms of the aligned spiders, thereby forming two units, a first unit comprising two spiders and connecting rods tending to move in one direction upon a certain change in pressure, and a second unit comprising the remaining two spiders and connecting rods tending to move in the opposite direction upon said certain change in pressure, the connecting rods of the two units alternating in peripheral sequence; a rocking beam mounted on said support between said two stacks to couple said units together, one arm of the rocking beam being connected to said one unit and the other arm of the rocking beam being connected to said other unit, whereby the movement of the ends of the two stacks is averaged and their power is totaled.

3. A pressure sensitive diaphragm capsule assembly including at least four diaphragm capsules arranged in two groups of centrally connected capsules, each group being mounted to permit movement of one endmost capsule wall in one direction and to permit movement of the other endmost capsule wall of the same group in the opposite direction under the same change in pressure; first coupling means connecting the endmost walls of the two groups moving in one direction to produce a first unit whose displacement is equal in magnitude to that of a single diaphragm capsule but of double the power; second coupling means connecting the endmost walls of the two groups moving in the opposite direction to produce a second unit whose displacement is equal in magnitude to that of a single diaphragm capsule but of double the power and in a direction opposite to that of the first coupling means; and a pivotally mounted member engaged by said first and second unit on opposite sides of the pivotal axis, whereby the displacement of the said member about its pivotal axis becomes proportional to the average of the movement of the four capsules.

4. A pressure sensitive diaphragm capsule assembly including at least four diaphragm capsules arranged in two groups of centrally connected capsules, each group being mounted to permit movement of one endmost capsule wall in one direction and to permit movement of the other endmost capsule wall of the same group in the opposite direction under the same change in pressure; first coupling means connecting the endmost walls of the two groups moving in one direction to produce a first unit whose displacement is equal in magnitude to that of a single diaphragm capsule but of double the power; second coupling means connecting the endmost walls of the two groups moving in the opposite direction to produce a second unit whose displacement is equal in magnitude to that of a single diaphragm capsule but of double the power and in a direction opposite to that of the first coupling means; and a rocking beam pivotally mounted between said first and said second unit and linked with its arms to said first and said second unit, respectively, for pivotal motion in the same sense by motion in opposite directions of said first and second units, whereby the power of the four diaphragm capsules is totaled and their displacement in response to pressure changes is averaged.

5. A pressure sensitive diaphragm capsule assembly as set forth in claim 4 in which the link connection between the rocking beam and the said units comprises connecting rods flexibly connected to the rocking beam and the said units, respectively by flat springs to eliminate lost motion.

6. A high power diaphragm assembly, particularly for aircraft altimeters, comprising a substantially cylindrical housing; a plurality of evacuated diaphragm capsules constituting a first stack mounted in said housing intermediate the ends of the stack for movement of the ends of the stack in opposite directions upon a change in pressure; a plurality of evacuated diaphragm capsules constituting a second stack mounted in said housing intermediate the ends of the second stack, coaxially with said first stack, for movement of the ends of the second stack in opposite directions upon a change in pressure; a spider carried by each of the ends of said first and said second stack, the spiders extending with their arms beyond the periphery of said capsules, the spider on one end of one stack being aligned with the spider at the corresponding end of the other stack, and the spider on the other end of the one stack being aligned with the spider at the other end of the other stack; connecting rods connecting the arms of the aligned spiders, thereby forming two units, a first unit comprising two spiders and connecting rods tending to move in one direction upon a certain change in pressure, and a second unit comprising the remaining two spiders and connecting rods tending to move in the opposite direction upon said certain change in pressure, the connecting rods of the two units alternating in sequence around the periphery of the capsules; a rocking beam mounted in said housing for pivotal movement between the two stacks of capsules to couple said two units together, one arm of said rocking beam being connected to said one unit and the other arm of the rocking beam being connected to said other unit; and a yoke hingedly connected to two connecting rods of one unit and extending over the end of said one unit for transmittal of the combined and averaged movement of all the capsules to an element to be actuated in response to changes in altitude.

WALTER ANGST.

REFERENCES CITED

The following references are of record in the file of this patent:

UNITED STATES PATENTS

| Number | Name | Date |
|---|---|---|
| 2,365,923 | Wilkinson et al. | Dec. 26, 1944 |
| 2,467,883 | Edwards, Jr. | Apr. 19, 1949 |

FOREIGN PATENTS

| Number | Country | Date |
|---|---|---|
| 262,672 | Great Britain | Dec. 16, 1926 |